Jan. 27, 1959     E. B. THAXTON     2,870,794

PIPE PLUGS

Filed June 10, 1954

INVENTOR.
ELLIS B. THAXTON
BY
ATTORNEY

United States Patent Office 2,870,794
Patented Jan. 27, 1959

2,870,794

PIPE PLUGS

Ellis B. Thaxton, Grand Prairie, Tex.

Application June 10, 1954, Serial No. 435,720

5 Claims. (Cl. 138—90)

This invention relates to pipe plugs and more particularly to a plug which may readily be inserted into the open end of a pipe section, and by manipulation of some of its novel elements from outside the pipe, it is caused to expand and set up an initial sealing engagement with the inside of the pipe to confine fluids therewithin and also to further cause pipe engaging means such as slips to engage with the inner surface of the pipe, whereby the plug is secured against untimely expulsion from the pipe due to pressures therein against the plug.

The principal object of my invention is to provide an effective sealing with the inside of the pipe, and an increasingly effective engagement with the wall of the pipe by the slips as the pressures in the pipe increase.

Novel features also include means whereby my plug may be readily released and removed from the pipe following release of the fluid pressure therein.

It is well known in the transmission of oil and gas that breaks occur in these pipe lines, and it is therefore frequently necessary to plug off or close sections thereof while repairs are made; also that most operators test each joint or length of pipe which has once been used, either on the site of contemplated re-use or on the pipe racks of supply yards before being returned to service. While the accompanying drawing shows my invention in place in the open end of a pipe, it will be understood that it may be used anywhere in an operative pipe line by cutting and removing a portion of the upper wall of the pipe. Such removed portion of pipe may be replaced and welded to its original position after my plug has served its purpose and is removed. Heretofore available equipment for accomplishing such tests or for blocking or plugging sections of pipe lines in situ have been very cumbersome and expensive and in many instances bull plugs or other obstructions have been welded into these pipe lines thus subjecting both operators and equipment to a high casualty rate caused by fires and explosions.

Operators skilled in the art will readily understand and appreciate the novel features of my invention as well as its simplicity and economy in use, from the following description together with the accompanying drawing in which.

Figure 1:
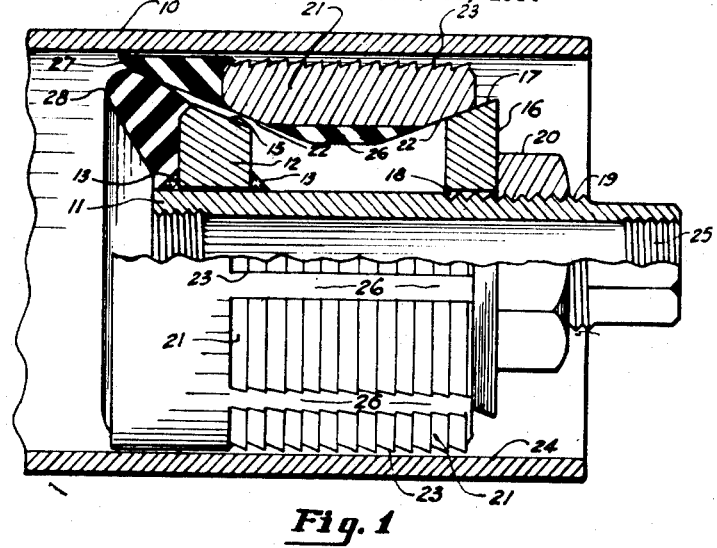
Figure 1 shows a length of pipe with my invention, partly in section, before expansion inside the pipe.
Figure 2:
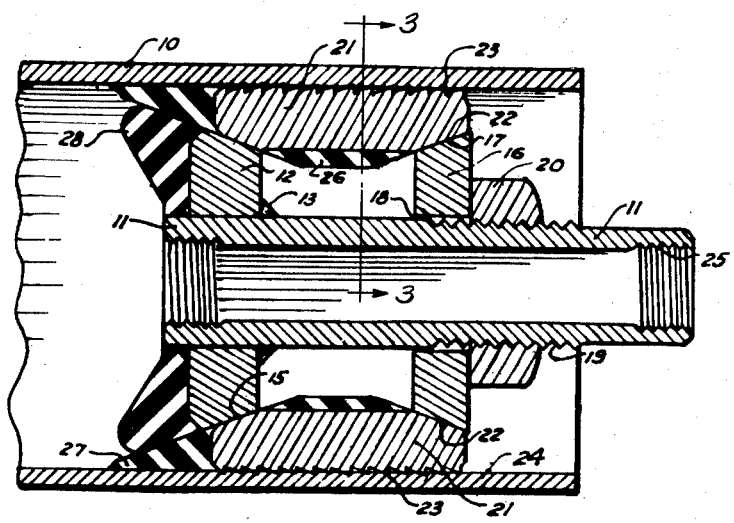
Figure 2 is a sectional view showing my invention in place and expanded into engagement with the pipe.
Figure 3:
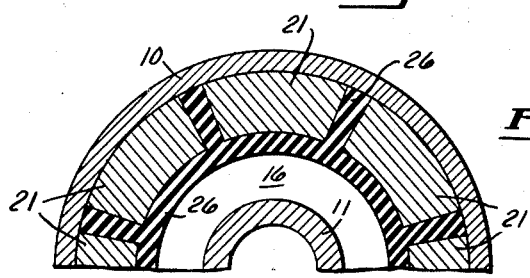
Figure 3 is a half-section view taken along line 3—3 in Figure 2.

In the several figures, like references indicate similar parts wherein 10 is a pipe section of the size to be plugged. 11 is a central mandrel having secured to one end a fixed wedge member 12, as by welding at 13—13, said member having a frusto-conical face 15 for purposes later to appear more fully herein. 16 is a wedge member similar to member 12 and having a frusto-conical face 17 opposite similar faces 15 of member 12. It will be noted that member 16 has a central bore or opening 18 of such size as to permit it to freely pass over mandrel 11 and the externally threaded section 19 of the latter which is adapted to receive the nut 20 whereby the wedge members 12 and 16 may be adjusted relative to each other along mandrel 11. Surrounding mandrel 11 and members 12 and 16 are a plurality of slip segments 21 having beveled inner ends 22 cooperative with the frusto-conical faces 15 and 17 of members 12 and 16 and having serrations 23 on their outer faces for engaging inner surface 24 of pipe 10. 25 is a threaded inner section of mandrel 11 for receiving external means whereby pressure may be introduced, retained in or relieved from the pipe as desired, and such means may consist of any combination of the many well-known valves, gages, plugs, etc. It will be understood that the size of the mandrel 11 may be varied so as to accommodate a larger opening through it to provide more rapid passage of fluid. 26 is a relatively soft body of rubber, or similar substance, in the outer periphery of which the slip segments are embedded, the segments being bonded to the rubber. The body has a tapered annular lip section 27 for engaging with a relatively harder rubber wedge 28 which is bonded to member 12, and said body being provided with a suitable surface for mating with the inner surface of lip 27 whereby the latter is expanded outwardly into sealing contact with pipe face 24 as hereinafter described in more detail.

Slip segments 21 are placed in a rubber mold, properly spaced in circular formation and a soft rubber body 26 is molded about and between, and bonded to these segments whereby a unitary body assembly of these parts is formed. Member 12 is rigidly joined to mandrel 11 by welding or another suitable method and harder rubber 28 is secured thereto as by molding and bonding. The body assembly is then passed over mandrel 11, member 16 is in turn passed over mandrel 11 and nut 20 is started on threaded section 19 of mandrel 11 so as to loosely engage with member 16.

My plug assembly is now complete and as will be noted in Figure 1 is freely received inside pipe 10 as the latter is of slightly larger inside diameter than the outside diameter of my loosely assembled plug. The arrangement of the respective parts is now such as to enable the securing of the mandrel assembly against rotation while nut 20 is tightened on the mandrel so as to bring members 12 and 16 closer together and thus engage the mating surfaces 22 of the ends of the slips with members 12 and 16 causing outward movement of the slips to engage the inside surface of the pipe. The end portion of mandrel 11 outside of the threaded section 19 may be hexagonal in shape to allow the mandrel to be held against rotation while nut 20 is tightened or loosened. Tightening of the nut 20 causes harder rubber 28 to move against the inside of sealing lip 27 of the soft rubber and distort the latter into sealing engagement with the inside surface of pipe 10. It will be readily understood that as nut 20 is tightened on the threaded section of mandrel 11 the serrations or teeth on the outer faces of the slip segments will be caused to engage more securely with the inside of pipe 10. Likewise as pressure increases inside of pipe 10 the wedging action of members 12 and 28 against the slip segments 21 and sealing lip 27 increases, both by pressure of the fluid inside the pipe and by movement of member 12 along the conical surfaces 22 of the slips, to further tend to expand and make more secure the fluid seal between the soft rubber and the inside of the pipe.

It will be understood that the rubber bonded to the slip segments is of such dimensions and strength as to withstand the pressures within the pipe, the rubber extending inwardly at lip section 27 in such volume as to provide adequate sealing resistance to all encountered pressures.

Removal of my plug from the pipe is readily accomplished by relieving the pressure therein as by manipulation of a control mechanism (not shown) which may be operatively connected with mandrel 11 as by engagement with threads 25 to effect exhaustion of the pressure from within the pipe. Nut 20 may then be unscrewed to again loosen the assembly and remove the wedging action from the slips which then retract away from the pipe by the action of the distorted soft rubber as it returns to its original position as shown in Fig. 1.

While I have described a preferred and easily assembled and operable form of my invention it will be obvious to those skilled in the art that many modifications of the several elements may be made, among which are:

Mandrel 11 and member 12 may be formed integrally;

An extension of member 12 might be employed to displace harder rubber 28;

Element 26 may be of any material possessing the physical characteristics of rubber.

What I claim is:

1. A plug for sealing against the inner surface of a pipe comprising a hollow resilient body having an outside diameter slightly smaller than the diameter of the inner surface of said pipe, said body having an annular sealing lip at one end and having a resilient slip-supporting portion between its ends; an annular series of radially outwardly facing slip segments each disposed axially of said body and embedded in the outer periphery of said supporting portion and bonded thereto, said segments each having a wedge portion at each end which extends inwardly through the resilient body; axially spaced annular wedge means within the hollow body underlying said wedge portions and adapted to engage said wedge portions to displace the slip segments radially outwardly into engagement with said surface; and means for forcing said wedge means to approach each other.

2. In a plug as set forth in claim 1, the hollow body having an axially outwardly facing frusto-conical bore section at each end; and the slip segments having portions extending into said bore sections and conforming in shape therewith.

3. In a plug as set forth in claim 2, said annular wedge means having rigid surfaces engaging said wedge portions, and one of said wedge means having a resilient wedge bonded thereto and engaging the portion of the bore section adjacent the sealing lip.

4. In a plug as set forth in claim 1, a hollow mandrel through said body, said mandrel passing through said wedge means, the first wedge means being fixed to said mandrel and the second wedge means being slidable thereon, and said forcing means comprising a nut threaded on said mandrel and engaging said second wedge means to force it toward said first wedge means.

5. A plug for sealing against the inner surface of a pipe comprising, a substantially cylindrical body of resilient material, said body having a bore therethrough including two frusto-conical sections each tapering outwardly toward opposite ends of the body and including an annular resilient sealing lip at one end of the body forming a continuation of one frusto-conical section; a plurality of slip segments embedded in the outer periphery of said body in annularly spaced relation and disposed axially thereof, the segments having at each end a tapered wedge portion passing through said frusto-conical sections of the bore and lying flush therewith; a mandrel through said bore and carrying two spaced oppositely facing frusto-conical wedges, one wedge engaging each complementary section of the bore; means on the mandrel for forcing said wedges to approach each other to displace said segments radially outwardly against said surface; and the wedge adjacent the lip carrying a yieldable frusto-conical portion adapted to expand the lip into contact with the inner surface of the pipe when said means is tightened.

References Cited in the file of this patent

UNITED STATES PATENTS

| 100,115 | Brown | Feb. 22, 1870 |
| 1,822,444 | Mac Clatchie | Sept. 8, 1931 |
| 2,107,315 | Wainwright | Feb. 8, 1938 |
| 2,246,685 | Johansen | June 24, 1941 |
| 2,493,556 | Stone | Jan. 3, 1950 |
| 2,517,626 | Berg | Aug. 8, 1950 |

FOREIGN PATENTS

| 233,275 | Great Britain | May 7, 1925 |
| 84,563 | Sweden | Oct. 8, 1935 |
| 575,397 | Great Britain | Feb. 15, 1944 |